(12) United States Patent
Belmont et al.

(10) Patent No.: US 8,055,415 B2
(45) Date of Patent: Nov. 8, 2011

(54) METHOD FOR BLOCKING WHEELS OF A HYBRID VEHICLE WHEN STOPPED AND ASSOCIATED TRANSMISSION DEVICE

(75) Inventors: Serge Belmont, Boulogne (FR); Olivier Boury, Nanterre (FR); Sebastien Besnard, Sceaux (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 1013 days.

(21) Appl. No.: 11/913,489

(22) PCT Filed: Apr. 26, 2006

(86) PCT No.: PCT/FR2006/050390
§ 371 (c)(1),
(2), (4) Date: Nov. 2, 2007

(87) PCT Pub. No.: WO2006/117492
PCT Pub. Date: Nov. 9, 2006

(65) Prior Publication Data
US 2008/0167782 A1 Jul. 10, 2008

(30) Foreign Application Priority Data

May 2, 2005 (FR) ...................................... 05 51148

(51) Int. Cl.
*G06F 17/00* (2006.01)
(52) U.S. Cl. ................ 701/53; 74/331; 74/335; 74/361; 74/340; 475/81; 475/295; 446/462; 446/463; 477/36; 477/154; 477/155; 192/84.3; 180/247

(58) Field of Classification Search .................... 701/53; 74/331, 335, 361, 368, 640, 665; 475/81, 475/295; 446/462, 463; 477/36, 154, 155; 192/84.3; 180/247
See application file for complete search history.

(56) References Cited

U.S. PATENT DOCUMENTS 4,417,642 A * 11/1983 Suzuki et al. ................. 180/249
(Continued)

FOREIGN PATENT DOCUMENTS
DE 10116989 A 10/2002
(Continued)

OTHER PUBLICATIONS

International Search Report mailed Aug. 23, 2006 in PCT/FR2006/050390.

*Primary Examiner* — James P Trammell
*Assistant Examiner* — McDieunel Marc
(74) *Attorney, Agent, or Firm* — Nicolas E. Seckel

(57) ABSTRACT

The invention essentially relates to a method for blocking wheels of a vehicle when stopped in which a transmission device (1) is placed between an output (2) of a heat engine (3) and a wheel (5) axle shaft (4). This device (1) comprises an input shaft (13) connected to the output (2) of the engine (3), an output shaft (31) connected to the wheel axle shaft (4), and at least one electrical machine (6, 7). The device also comprises a mechanical assembly (12) interconnecting the input shaft (13), the output shaft (31) and the shaft (8, 9) of the machine. This assembly (12) is connected to a bridge (15) that, in turn, is connected to the wheel (5) axle shaft (4). The invention provides that, in order to block the wheels when the vehicle is stopped and to limit an observable torque on the elements of the assembly (12), the wheel axle shaft is blocked by the mechanical assembly.

10 Claims, 3 Drawing Sheets

U.S. PATENT DOCUMENTS

Figure 1:
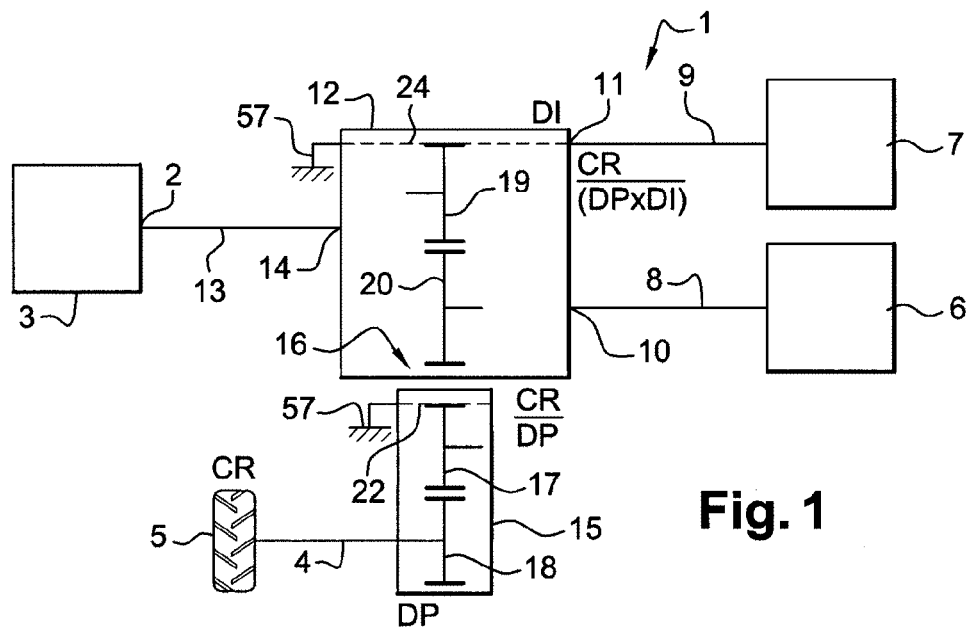

| | | | |
|---|---|---|---|
| 4,864,889 A * | 9/1989 | Sakakibara et al. | 475/211 |
| 4,962,835 A * | 10/1990 | Pruss | 477/125 |
| 5,085,061 A * | 2/1992 | Maudsley | 70/225 |
| 5,570,756 A * | 11/1996 | Hatcher | 180/287 |
| 5,934,395 A | 8/1999 | Koide et al. | |
| 6,250,262 B1 * | 6/2001 | Duke | 123/43 A |
| 7,219,967 B2 * | 5/2007 | Magnien et al. | 303/152 |
| 2001/0051556 A1 | 12/2001 | Takenaka | |
| 2002/0082134 A1 * | 6/2002 | Hirt et al. | 477/3 |
| 2004/0058769 A1 | 3/2004 | Larkin | |
| 2004/0178673 A1 * | 9/2004 | Magnien et al. | 303/11 |
| 2005/0064974 A1 | 3/2005 | Bezian et al. | |
| 2005/0247503 A1 * | 11/2005 | Imazu | 180/300 |

FOREIGN PATENT DOCUMENTS

| | | |
|---|---|---|
| EP | 0552140 A | 7/1993 |
| EP | 0769403 A | 4/1997 |
| EP | 1164043 A | 12/2001 |
| EP | 1281557 A | 2/2003 |
| FR | 2832357 A | 5/2003 |

* cited by examiner

METHOD FOR BLOCKING WHEELS OF A HYBRID VEHICLE WHEN STOPPED AND ASSOCIATED TRANSMISSION DEVICE

The present invention relates to a method for blocking wheels of a hybrid vehicle when stopped and a transmission device associated therewith. An objective of the invention is in particular to ensure a secure blocking of the wheels of the hybrid vehicle, by implementing elements that modify as little as possible the architecture of the transmission device. A particularly advantageous application of the invention is in the field of hybrid propulsion motor vehicle, but it could also be used with other types of hybrid motorization land vehicle.

Transmission devices for hybrid vehicles are known which include a heat engine, two electrical machines, and one, two, or several planetary gear trains connected to one another inside a mechanical assembly. An example of such a device is described in French patent application FR-A-2832357. With such transmission devices, the power of the heat engine can be, either transmitted directly to the wheels, or derived through an electric chain.

The electric chain connects the electrical machines capable of acting as motors or as generators depending on the energy values received electrically and/or mechanically at their terminals and at their shaft, respectively. The derived power is retransmitted to the wheels of the vehicle or stored, as appropriate, in a storage system. This derived power makes it possible to adapt precisely the torque applied to the wheels of the vehicle to that requested by the driver, while also adapting precisely the torque and speed of the heat engine so as to optimize its output.

In addition, the electrical chain includes in particular a first inverter, a second inverter, as well as an electrical bus.

When one of the machines acts as a generator, the AC voltage signals observable between its phases are transformed by the inverter associated to this machine into a DC voltage signal observable on the bus. When one of the machines acts as a motor, the DC voltage signal observable on the bus is transformed into out of phase AC voltage signals by the inverter associated to this machine. These voltage signals are applied to the phases of the machine that functions as a motor.

In the case where no storage system is connected to the bus, the energy produced by one of the machines is automatically consumed by the other machine. As a variant, a storage system, such as a battery or a supercondenser, is connected to the bus. The two machines can then function simultaneously as generators or as motors.

Such a transmission device must be able to be blocked in rotation when the vehicle is stopped and parked. This device must also be able to take a so-called parking brake position, in which the wheels of the vehicle are immobile.

Known transmission devices use the same parking brake system as on automatic gear boxes. This braking system includes a finger that is actuated manually via a cable or with the help of a specific actuator. This finger is designed to be inserted into a notched wheel that is arranged, either directly inside a bridge, or on a shaft directly connected to this bridge. This bridge forms a constant gear formed of one or several gears and is connected directly to the wheels. As a result, the wheels of the vehicle are blocked in rotation by blocking in rotation one of the gears of the bridge.

However, the arrangement of the braking system on the shaft directly connected to the bridge involves important torques. That is, the system is disposed between the mechanical assembly and the bridge of the vehicle. As a consequence, the system must be dimensioned for a torque equal to the torque observable at the wheel divided by a gear ratio between the bridge and an outlet of the mechanical assembly.

In addition, this braking system is an added element in the transmission, which requires integration into this device. Thus, this system must be actuated in a specific manner independent from the transmission device. This actuation is performed, either manually by a cable, or by an actuator. In addition, a braking system can cause insertion problems if the finger is facing a tooth at the time of actuation. And this system can cause dimensioning problems because the cases where extraction of the finger occurs when the vehicle is on a slope must be taken into account.

The invention proposes in particular to limit the torques that are applied to the braking system and to integrate this braking system inside the transmission device.

To this effect, in the invention, to block the wheels of the vehicle when it is stopped, an element upstream of the mechanical assembly is blocked. More precisely, in the invention, the wheel shaft is blocked via the mechanical assembly.

Thus, in a first embodiment of the invention, an element of the mechanical assembly that is connected in rotation with the wheel is blocked. The torques in play are then reduced by the gear ratio between the bridge and an outlet of the mechanical assembly and by an intermediate gear ratio between an outlet of the mechanical assembly and a shaft of the transmission device. The reduction of the torques in play makes it possible to limit the size of the elements of the braking system and thus to make the transmission device more compact than that of the state of the art. In addition, the elements of the braking system will be easy to move along the shaft on which they are mounted.

In practice, the element of the assembly connected to the wheel shaft is attached to the shaft of one of the machines using a first dog clutch. And this shaft is connected to an immobile element, such as a base of the mechanical assembly, using a second dog clutch. The use of dog clutches to block the wheels is economical, to the extent that some of the dog clutches used to block wheels of the system are already used for mode changes of the transmission device.

As compared to the notched wheel, these dog clutches are easier to implant into the device and easier to actuate. In addition, with a dog clutch, the problems of insertion or extraction in a slope can be easily solved by turning slightly the shaft of a power source. Teeth of the dog clutches will thus be able to enter into cooperation easily with pinion protrusions.

In a second and a third embodiment of the invention, in order to block the wheel shaft, degrees of freedom of the mechanical assembly are eliminated. A degree of freedom is defined as being a capability of the mechanical assembly in which the speeds of the elements of this assembly are not dependent from one another.

More precisely, it has been seen that the mechanical assembly was formed by one or several planetary gear trains. Each gear train has three elements: a sun gear, a planet carrier, and a ring gear. Each gear train has two degrees of freedom since the speed of one element of the gear train can always be expressed as a function of the input speed and output speed. Thus, the speeds of the elements of an planetary gear train are controlled by the following equation (1) called "Willis formula":

$$RP + K1 \cdot RC + K2 \cdot RPS = 0 \qquad (1)$$

RP corresponds to the speed of the sun gear, RC corresponds to the speed of the ring gear, and RPS corresponds to the speed of the planet carrier. K1 and K2 are constants.

If the sun gear and the ring gear, for example, are connected to each other, a second condition is imposed, which is:

$$RP = K3 \cdot RC \qquad (2)$$

This equation (2) expresses the fact that the speed RP of the sun gear is proportional to the speed RC of the ring gear.

If the sun gear and the planet carrier are connected to each other, a third condition is imposed, which is:

$$RP = K4 \cdot RPS \qquad (3)$$

This equation (3) expresses the fact that the speed RP of the sun gear is proportional to the speed RPS of the planet carrier.

By combining (1), (2) and (3), the following equation is obtained:

$$RP*(1 + K1/K3 + K2/K4) = 0 \qquad (4)$$

As a consequence, according to (4), by adding two additional conditions regarding the speeds of the elements of the planetary gear train, i.e., by eliminating the two degrees of freedom of this gear train, a speed of zero is obtained for the three elements. Thus, by eliminating the two degrees of freedom of the gear train, the wheel shaft to which it is connected has been blocked. A parking brake position is thus obtained for the system.

A third embodiment corresponds in fact to a variant of the second embodiment. In this embodiment, instead of connecting two elements with each other to eliminate one of the degrees of freedom, one of the elements of the gear train is attached to a fixed element, such as a BATI.

Thus, to eliminate a first degree of freedom, one of the elements of the gear train, or, more exactly, a shaft to which it is connected, is blocked in rotation. If the planet carrier is blocked, the following equation is obtained:

$$RPS = 0 \qquad (2')$$

And to eliminate the second degree of freedom, the two other elements of the planetary gear train are connected with each other, that is, the sun gear and the ring gear. Thus, the following equation is obtained:

$$RP = K3 \cdot RC \qquad (3')$$

By combining (1), (2') and (3'), the following equation is obtained:

$$RP*(1 + K1/K3 + 0) = 0 \qquad (4')$$

As a consequence, here also, a parking brake is obtained. That is, the speeds of the various elements forming the mechanical assembly are zero. As a result, the wheel shaft that is connected to this mechanical assembly also has a speed of zero.

As a variant, two different elements of the gear train could be connected to the base to eliminate the two degrees of freedom of the gear train.

In practice, the mechanical assembly is formed by two planetary gear trains connected to each other so as to present four coupling elements, or possibly five. A coupling element is an element to which a shaft of the transmission device, such as the shaft of the engine, the shaft of the machines or the shaft of wheels, is capable of being connected. However, these gear trains are always connected to one another so as to present two degrees of freedom. As a consequence, like in the case of a simple planetary gear train, there are only two degrees to be eliminated to immobilize the mechanical assembly. In other words, by imposing two conditions on the speeds of the elements of the mechanical assembly formed by several gear trains, this mechanical assembly, and thus the wheel shaft that is connected thereto, can be immobilized.

The invention thus concerns a method for blocking the wheels of a vehicle when it is stopped in which:
a power transmission device between an outlet of a heat engine and a shaft of wheels is implemented, this device including:
an inlet shaft connected to the outlet of the heat engine, and an outlet shaft connected to the shaft of wheels,
at least one electrical machine having a shaft, and
a mechanical assembly connecting the inlet shaft, the outlet shaft and the shaft of the machine with one another, this mechanical assembly being connected to a bridge, which is in turn connected to the shaft of wheels,
characterized in that the shaft of wheels is blocked via the mechanical assembly.

Further, the invention concerns a power transmission device between an outlet of a heat engine and a shaft of wheels, this device including:
an inlet shaft connected to the outlet of the heat engine, and an outlet shaft connected to the shaft of wheels,
at least one electrical machine having a shaft, and
a mechanical assembly connecting the inlet shaft, the outlet shaft and the shaft of the machine with one another, this mechanical assembly being formed by at least two planetary gear trains, these two planetary gear trains having each several elements that mesh with one another, including a sun gear, planet gears connected to a planet carrier and a ring gear,
characterized in that it includes:
a dog clutch disposed on the shaft of the machine and capable of connecting this shaft to a fixed element.

Figure 2:
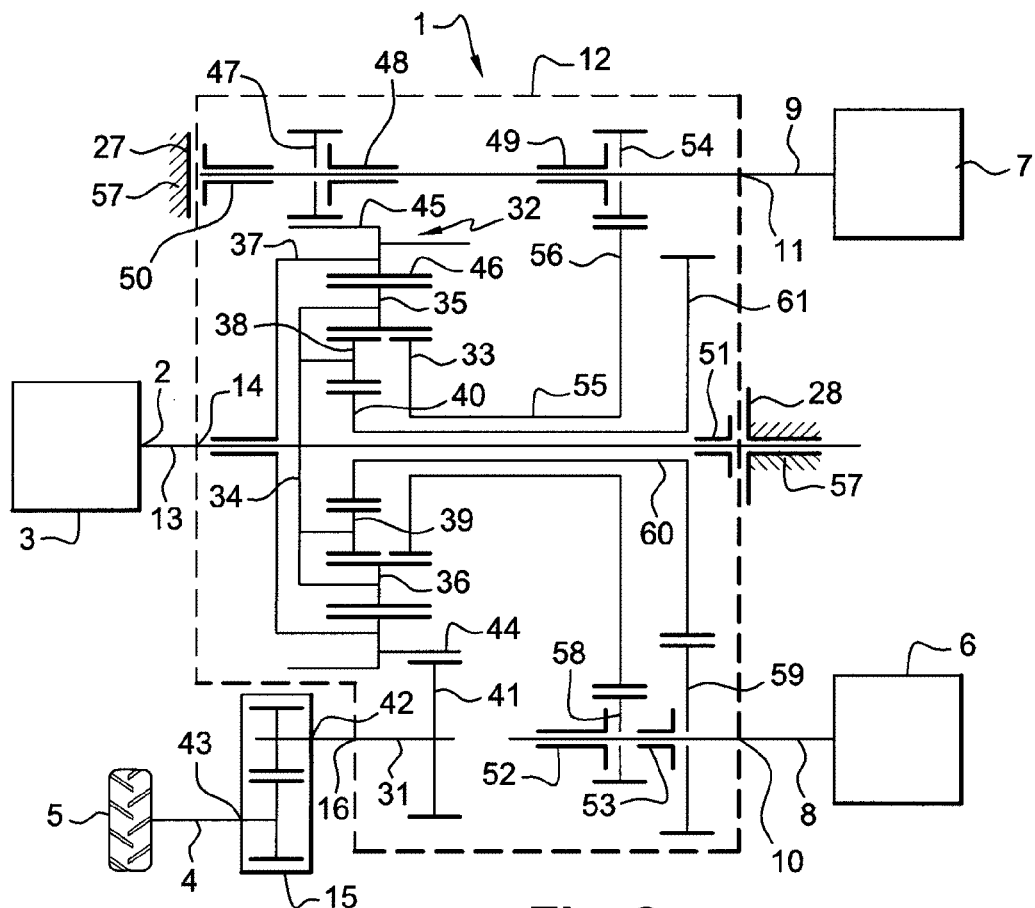
Figure 3A:
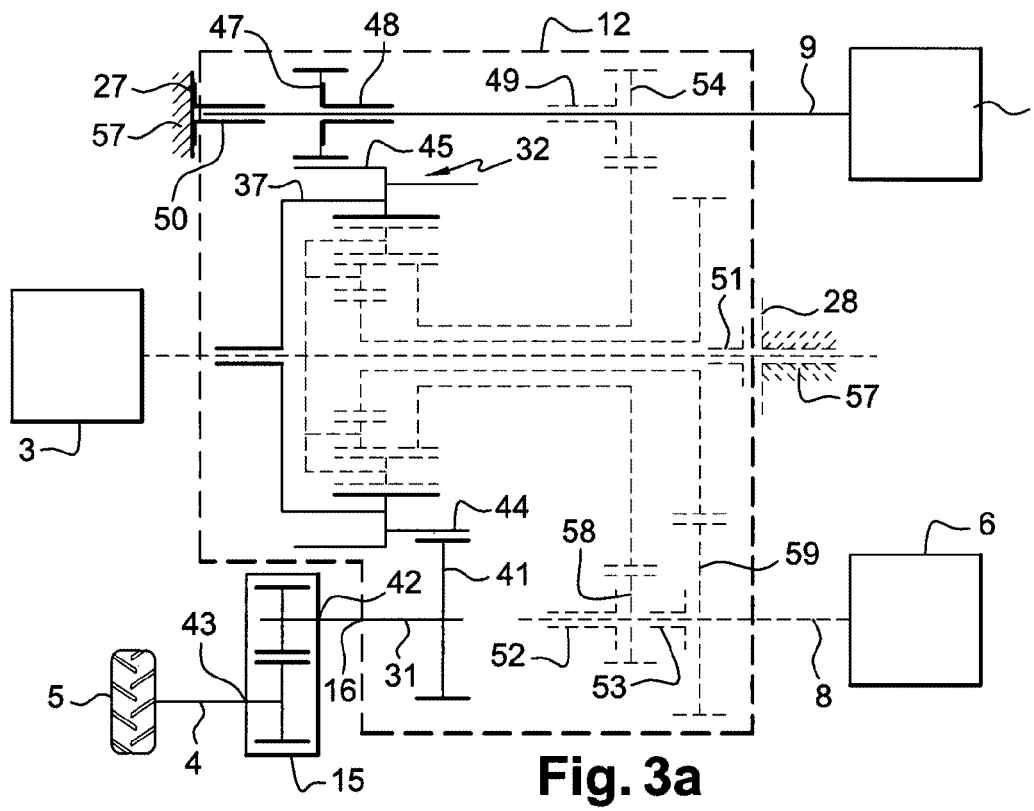
Figure 3B:
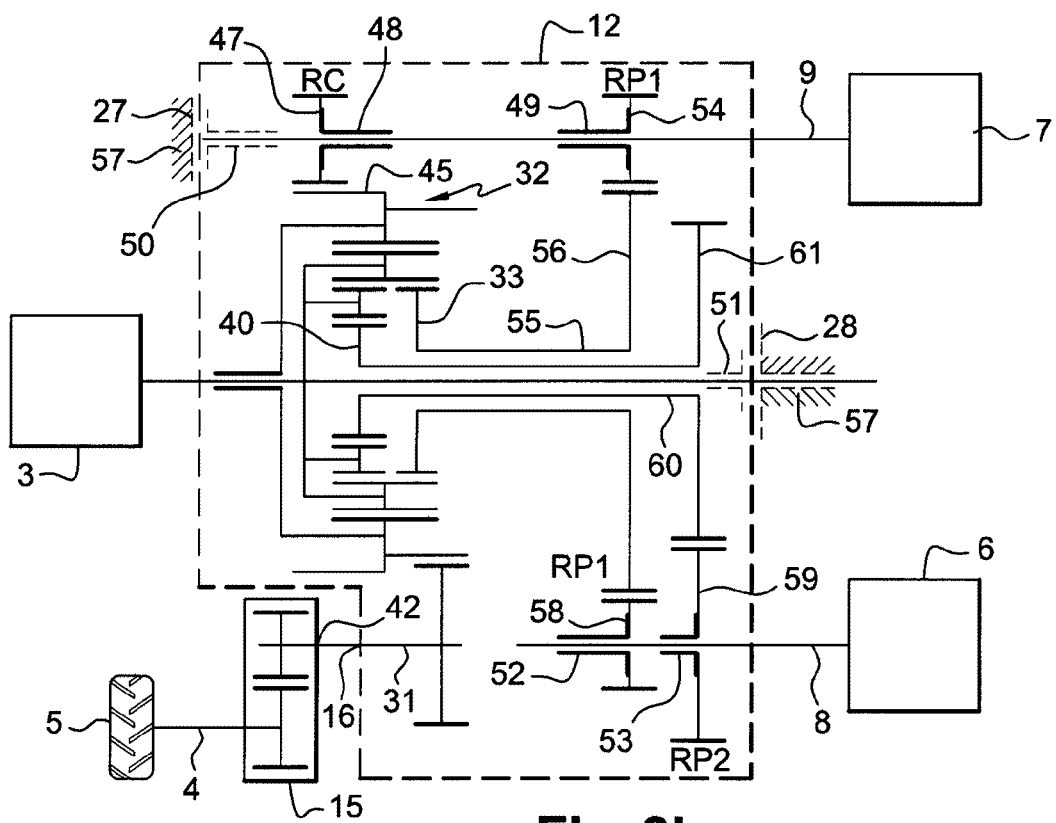
Figure 3C:
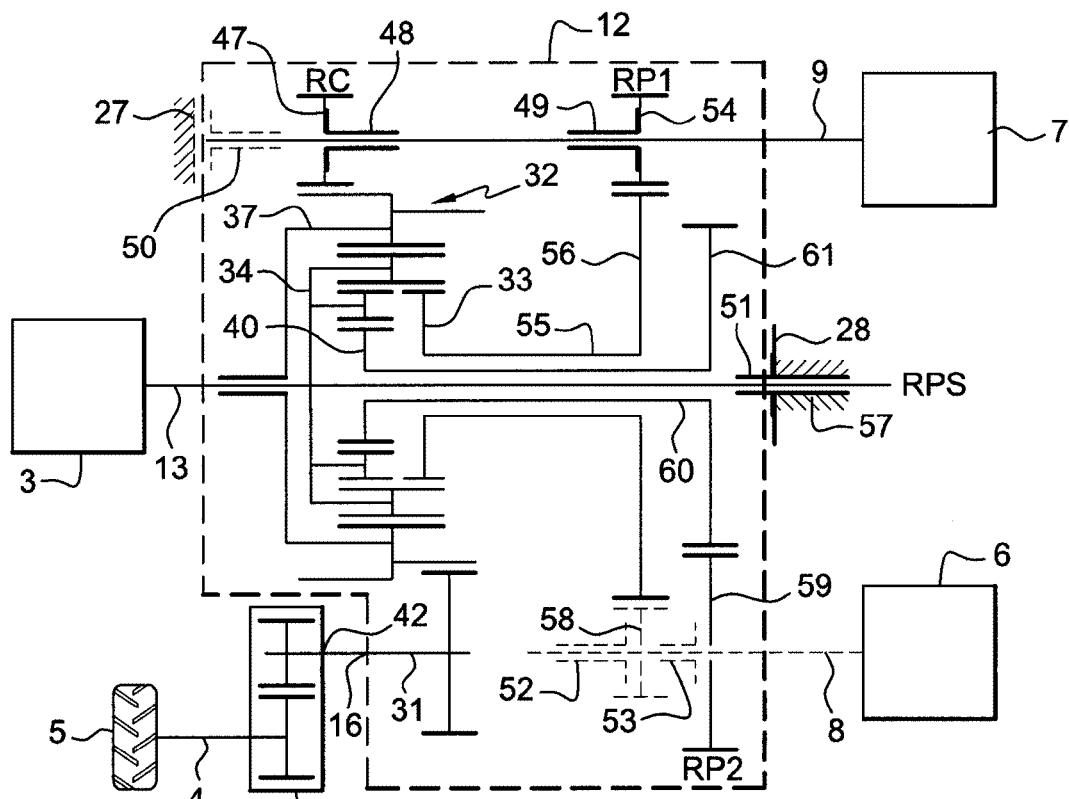
Figure 4:
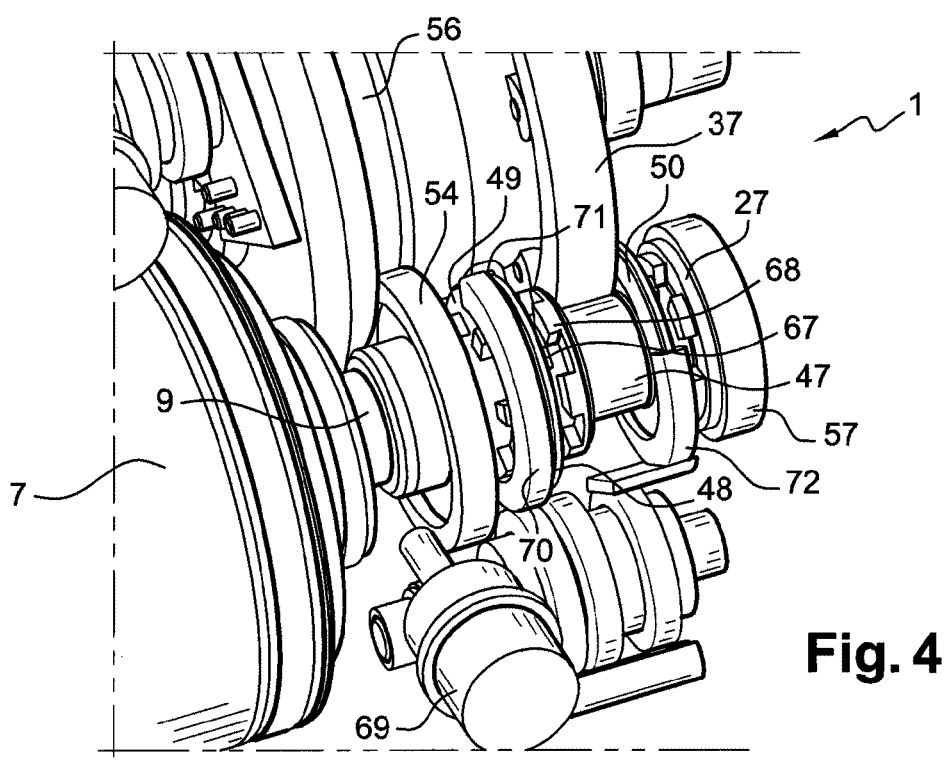

The invention will be better understood by reading the following description and by examining the accompanying figures. These figures are given only as non-limitative examples of the invention. These figures show:

FIG. 1: a schematic view of a transmission device according to the invention that makes it possible to block the shaft of wheels via the mechanical assembly;

FIG. 2: a detailed schematic view of the transmission device of FIG. 1;

FIG. 3*a*-3*c*: exemplary embodiments of a parking brake according to the invention from the transmission device according to the invention;

FIG. 4: a perspective view of the device according to the invention centered on the shaft of one of the machines.

On the figures, identical elements are identified by the same reference numeral.

FIG. 1 shows a schematic view of a transmission device 1 according to the invention between an outlet 2 of a heat engine 3 and a shaft 4 of wheels 5.

This device 1 has a first electrical machine 6 and a second electrical machine 7. These machines 6 and 7 have a shaft 8 and a shaft 9, respectively. These shafts 8 and 9 are connected to a driving inlet 10 and 11, respectively, of a mechanical assembly 12. This device 1 also has an inlet shaft 13 connected to the outlet 2 of the heat engine 3 and a driving inlet 14 of the mechanical assembly 12. The shaft 4 is connected via a bridge 15 to a driving outlet 16 of the assembly 12.

The bridge 15 is formed, for example, by wheels 17 and 18. The bridge 15 forms in general a permanent gear and has a fixed gear ratio equal to DP.

The mechanical assembly 12 is a gear whose gear ratio is variable. For a given configuration, this mechanical assembly 12 can be equivalent to a gear assembly formed by the wheels 19 and 20 having an intermediate gear ratio of a value DI.

In the state of the art, a shaft 22 is connected upstream of the bridge 15 to the mechanical assembly 12 and to this bridge 15. To block the shaft 4 of wheels 5 in a parking brake position, this shaft 22 is connected to an immobile element 57 that is in general a base of the device 1. The torque observable on the shaft 4 of wheels 5 is noted CR. The brake torque CF observable on the shaft 22 is equal to the torque observable on the wheels reduced by the ratio DP, i.e., CF=CR/DP.

In the invention, a shaft 24 connected to the shaft 4 of wheels 5 and to the mechanical assembly 12 is blocked. More precisely, this shaft 24 is connected to the immobile element 57. In other words, in the invention, to obtain a parking brake, the shaft 4 of wheels 5 is blocked via the mechanical assembly, in the area of a shaft of one of the parts 3, 6 or 7 of the system. Thus, the brake torque CF' observable on the shaft of wheels is reduced by the ratio DP and by the intermediate transmission ratio DI. That is, the torque CF' is equal to CR/(DI*DP). Thus, it is easier to connect the shaft 24 to a fixed element than to connect the shaft 22 of a fixed element, because the torque observable on the shaft 24 is divided by DI, as compared to the torque observable on the shaft 22.

In a particular embodiment described in more details at FIG. 3a, the shaft 24 and the shaft 9 of the second machine 7 are the same. In the other embodiments (see FIGS. 3b and 3c), a shaft connected to the shaft of wheels is not directly blocked but all the degrees of freedom of the assembly 12 are eliminated.

FIG. 2 shows a more detailed schematic view of the transmission device according to the invention.

The shafts 8 and 9 of the machines 6 and 7 are still connected to the driving inlets 10 and 11, respectively, of the mechanical assembly 12 whose limits are shown by a closed interrupted line. The inlet shaft 13 is connected to the outlet 2 of the heat engine 3 and to the driving inlet 14 of the assembly 12. The device 1 also has an outlet shaft 31 connected both to the shaft 4 of wheels 5 and to the driving outlet 16 of the assembly 12.

More precisely, the mechanical assembly 12 has a so-called Ravigneaux-type gear train 32. This gear train 32 has four mechanical connection elements: one for the inlet shaft 13, another for the outlet shaft 31 and the two others for the shafts 8 and 9 of the machines 6 and 7. Like a standard planetary gear train, this gear train 32 has a first sun gear 33, a planet carrier 34 carrying first planet gears 35 and 36, and a ring gear 37, which mesh mutually. In addition, the gear train 32 has second planet gears 38 and 39, and a second sun gear 40. The second planet gears 38 and 39 are carried by the common planet carrier 34 and mesh both with the planet gears 35 and 36 and with the second sun gear 40.

Thus, an analogy can be made between the gear train 32 and two simple planetary gear trains: a first gear train has the first sun gear 33, the first planet gears 35 and 36, and the ring gear 37. A second gear train has the second sun gear 40, the second planet gears 38 and 39, and is without a ring gear. These two gear trains are connected with one another so as to have two degrees of freedom. That is, the fact that the first 35, 36 and the second 38, 39 planet gears mesh with one another eliminates a first degree of freedom out of the four that are theoretically available on the two gear trains. And the fact that the planet carriers of the two gear trains are the same makes it possible to eliminate a second degree of freedom. As a variant, the gear trains are connected in a different manner so as to have two degrees of freedom.

In this embodiment, the inlet shaft 13 is connected both to the outlet 2 of the heat engine 3 and to the common planet carrier 34. The shaft 4 of wheels 5 is connected to the ring gear 37 via the bridge 15, the outlet shaft 31 and a wheel 41. More precisely, the wheel 41 attached to an end of the outlet shaft 31 meshes with the ring gear 37. This shaft 31 is connected to an inlet 42 of the bridge 15. And the shaft 4 of wheels 5 is connected to an outlet 43 of the bridge 15.

The ring gear 37 carries two outer sets of teeth 44 and 45 and an inner set of teeth 46. The wheel 41 meshes, as it has been seen, with the outer set of teeth 44. The first planet gears 35 and 36 mesh with the inner set of teeth 46. And, as will be seen below, a pinion 47 meshes with the outer set of teeth 45.

The device 1 further includes six distinct dog clutches 48-53 capable of connecting the shaft on which they are mounted with a pinion corresponding thereto. This pinion is either connected to one of the elements of the gear train 32 or to an immobile element. This immobile element is in general the base 57 of the assembly 12. To this effect, these dog clutches 48-53 are driven in rotation by the shaft on which they are mounted, and are capable of moving along this shaft. When a pinion does not enter into cooperation with a dog clutch, it is mounted free in rotation on its shaft.

More precisely, the dog clutch 48 is capable of connecting the shaft 9 to the pinion 47 that meshes with the ring gear 45. The dog clutch 49 is capable of connecting the shaft 9 to the pinion 54 that is connected to the first sun gear 33 via a hollow shaft 55 and a wheel 56. The dog clutch 50 is capable of connecting the shaft 9 to a pinion 27 which is the base of the assembly 12. The dog clutch 51 is capable of connecting the shaft 13 to a pinion 28 connected to the base 57. The dog clutch 52 is capable of connecting the shaft 8 to a pinion 58 that is connected to a first sun gear 33 via the hollow shaft 55 and the wheel 56. the dog clutch is capable of connecting the shaft 8 to a pinion 59 that is connected to a second sun gear 40 via a hollow shaft 60 and a wheel 61.

The dog clutches 48 and 49 make it possible for the device to be operated in two different operation modes. More precisely, in a first operation mode implemented for relatively short speed ratios, the shaft 9 is connected to the shaft 4 of wheels 5. To this effect, the dog clutch 48 and the dog clutch 53 are engaged in the pinions 47 and 59, respectively, whereas all other dog clutches 49-52 are disengaged from the pinions corresponding thereto. This first mode is implemented during setting in movement of the hybrid vehicle or during driving in reverse.

Then, as soon as the shaft 4 of wheels 5 has a rotation speed higher than that of the sun gear 33 (adjusted by gear ratios), the device 1 shifts to the second operation mode. In this second operation mode, the shaft 9 of the second machine is connected to the sun gear 33. To this effect, the dog clutch 49 and the dog clutch 53 are engaged in the pinions 54 and 59, respectively, whereas all the other dog clutches 48, 50-52 are disengaged from the pinions corresponding thereto. This second mode is implemented for speed ratios longer than those of the first mode. By limiting the rotation speed of the second machine 7, this second mode makes it possible to limit a power derived into the electrical chain (not shown) connecting these two machines 6 and 7 with each other.

In general, when the device 1 is in a traction phase (the engine provides power to the wheels) or energy storage phase (the wheels drive the engine), the first machine 6 operate as a generator (generator, respectively), whereas the second machine 7 operates as a motor (generator, respectively). In the case where a battery is connected to the electrical bus (not shown) connecting the machines, these machines 6 and 7 could also operate simultaneously as motors or as generators, for example, in an all-electrical mode. The heat engine 3 can then be stopped and the inlet shaft 13 that is connected thereto can then be immobilized via the dog clutch 51. To this end, the dog clutch 51 is engaged into the pinion 28.

As a variant, the assembly 10 is formed by gear trains connected differently. As a variant, the shafts 8 and 9, the inlet shaft 10 and the outlet shaft 15 are connected to different elements of the gear train 32. As a variant, the transmission device 1 has only one electrical machine.

FIG. 3a shows a first exemplary embodiment of a parking brake using dog clutches 48-53 of the transmission device 1.

In this first embodiment of a parking brake, the shaft 9 of the second machine 7 is connected to an element of the mechanical assembly 12 that is connected directly to the shaft 4 of wheels 5. And this shaft 9 is immobilized. More precisely, the dog clutch 48 is engaged inside the pinion 47 to connect the shaft 9 to the shaft 4 of wheels 5 via the wheel 47, the ring gear 37, the wheel 41, the outlet shaft 31 and the bridge 15. the dog clutch 50 is engaged in the immobile pinion 27. Thus, by immobilizing the ring gear 37, the outlet shaft 31 and the shaft 4 of wheels 5 are immobilized.

The other elements of the mechanical assembly are shown in interrupted line because they do not participate in blocking the shaft 4 of wheels 5.

The position of the other dog clutches 50-53 is indifferent. However, preferably, the dog clutch 53 is engaged in the pinion 59. In this manner, as soon as the vehicle is set in motion, the dog clutch 50 can disengage from the element 57 and the device 1 can then operate in the first mode.

The gear ratio between the wheels 4 and the shaft 9 is globally equal to the gear ratio of the bridge 15 multiplied by the gear ratio between the wheel 41 and the pinion 47. That is, the ring gear 37, which is both a driving element and a driven element, does not intervene in the global gear ratio.

This first embodiment is easy to implement because only the dog clutch 57 must be integrated. That is, the dog clutch 48 already exists and is used to operate the device 1 in the various modes.

FIG. 3b shows a second exemplary embodiment of a parking brake. In this embodiment, the two degrees of freedom are eliminated by connecting elements of this gear train with one another.

More precisely, here, the ring gear 45 is connected to a first sun gear 33 via the shaft 9. To this end, the dog clutch 48 is engaged into the pinion 47 and the dog clutch 49 is engaged into the pinion 54. The ring gear 37 is then connected to the shaft 9 via the pinion 47. The sun gear 33 is then connected to the shaft 9 via the shaft 55 and the wheel 56. A proportional relationship between the speed of the first sun gear 33 and the ring gear 37 is then imposed, i.e.: RP1−K·RC.

RP1 is the speed of the first sun gear 33. RC is the speed of the ring gear 37 and K is a constant. Thus, a first degree of freedom of the gear train 32 is eliminated.

Further, the first sun gear 33 is connected to the second sun gear 40 via the shaft 8. To this end, the dog clutch 52 is engaged into the pinion 58 and the dog clutch 53 is engaged into the pinion 59. The first sun gear 33 is then connected to the shaft 8 via the shaft 55 and the wheel 56. The second sun gear 40 is then connected to the shaft 8 via the shaft 60 and the shaft 61. Thus, a second proportional relationship between the speed of the first 33 and second 40 planet gears is imposed, i.e.: RP1=K'·RP2. The speed of the second sun gear is RP2, and K' is a constant. Thus, a second degree of freedom of the gear train 32 is eliminated.

By eliminating in this way two degrees of freedom of the gear train 32, out of the two it had, all its elements are immobilized. The equation characteristic of the gear train 32 evidences that the speeds of the elements of this gear train are zero if two additional conditions on speeds are introduced (see equation (4)). By immobilizing this gear train 32, the shaft 4 of wheels 5 that is connected thereto via the bridge 15 is immobilized. And thus, the desired parking brake position is obtained.

The dog clutches 50 and 51 are shown in interrupted line because they do not participate in blocking the wheels 5. Their positions are thus indifferent for implementing this parking brake.

More generally, to obtain a parking brake according to the invention, two different connections are performed inside the gear train 32 to eliminate the two degrees of freedom of the gear train 32.

FIG. 3c shows a third embodiment of a parking brake according to the invention. In this embodiment, the two degrees of freedom of the mechanical assembly 12 are eliminated by connecting two elements of the gear train 32 with one another and by immobilizing a third.

More precisely, here, the ring gear 37 and the first sun gear 33 are connected to each other via the shaft 9, as previously. To this end, the dog clutches 48 and 49 are engaged in the pinions 47 and 54, respectively. The ring gear 37 is then connected to the shaft 9 via the pinion 47. The sun gear 33 is then connected to the shaft 9 via the shaft 55 and the wheel 56. Thus, a first degree of freedom is eliminated by imposing a proportional relationship between the speed of the ring gear 37 and the speed of the first sun gear 33, i.e., RP1=K·RC.

Further, the shaft 13 that is connected to the planet carrier 34 is connected to the base 57. To this end, the dog clutch 51 is engaged into the pinion 28 connected to the base 57. By immobilizing the common planet carrier 34, RPS=0 is obtained. Thus, a second degree of freedom is eliminated.

By eliminating the two degrees of freedom of the gear train 32, all the elements of this gear train 32 and all the elements connected thereto are blocked in rotation. As a consequence, the shaft 4 of wheels 5, which is connected to the gear train 32 via in particular the bridge 15 and the shaft 31, is blocked. And the desired parking brake position is once again obtained.

Normally, the other dog clutches 50, 52 and 53 shown in interrupted line do not participate to the blocking. Their position is thus indifferent.

As a variant, to eliminate two degrees of freedom of the assembly 12, it would be possible to immobilize two elements of the gear train 32, for example, by engaging the dog clutches 52 and 53 and by connecting the shaft 8 to an immobile element.

FIG. 4 shows a spatial view of the device according to the invention, centered on the shaft 9 of the second machine 7.

This figure evidences with particularity the fact that the ring gear 37 meshes with the pinion 47. Further, the pinion 27 mounted at the end of the shaft is attached to the base 57. The pinion 54 meshes with the wheel 56.

As has been seen, the dog clutch 49 is capable of entering into cooperation with the pinion 54. The dog clutch 48 is capable of entering in cooperation with the pinion 47. And the dog clutch 50 is capable of entering into cooperation with the fixed pinion 27.

To this effect, each dog clutch 48-50 has teeth 67 that are capable of entering into cooperation with protrusions 68 of the pinions. More precisely, when a dog clutch is moved along the shaft 9, in the direction of the pinion corresponding thereto, the teeth 67 penetrate into the space separating two successive protrusions 68. A face of each teeth is then pressed against a face of each protrusion of the pinions. The dog clutch can thus drive the pinion corresponding thereto in rotation.

In general, the dog clutches 48-50 are moved in translation via forks 70-72 that are in turn moved by a DC motor 69. This motor is controlled by a microcontroller that detects the moment when, as a function in particular of the speeds of the various parts of the device 1, the parking brake position must be engaged.

Thus, to obtain the parking brake described in FIG. 3a, the dog clutch 48 is caused to enter into cooperation with the pinion 47 and the dog clutch 50 is caused to enter into cooperation with the pinion 27.

In order to connect the ring gear 37 to the first sun gear 33, as is the case for the parking brakes of FIGS. 3b and 3c, the dog clutch 49 is caused to enter in cooperation with the pinion 54 and the dog clutch 48 with the pinion 47.

The invention claimed is:

1. Method for blocking the wheels of a stopped vehicle in which:
a power transmission device is implemented between an outlet of a heat engine and a shaft of wheels, this device including:
an inlet shaft connected to the outlet of the heat engine, and an outlet shaft connected to the shaft of wheels,
at least one electrical machine having a shaft, and
a mechanical assembly connecting the inlet shaft, the outlet shaft and the shaft of the machine with one another, this mechanical assembly being connected to a bridge, which is in turn connected to the shaft of wheels,
wherein the shaft of wheels is blocked via the mechanical assembly,
wherein the mechanical assembly is made up of two planetary gear trains, these two planetary gear trains each having several elements that mesh mutually, including a sun gear, planet gears connected to a planet carrier, and a ring gear;
wherein connections between the elements of the mechanical assembly are organized so that this assembly has only two degrees of freedom, one degree of freedom being a capability of the mechanical assembly in which the speeds of the elements of the assembly are not dependent from one another, and these two degrees of freedom are eliminated inside the mechanical assembly.

2. Method according to claim 1, wherein:
a last of the elements of the assembly, which is connected directly to the bridge, is immobilized.

3. Method according to claim 1, wherein a last of the elements of the assembly, which is connected directly to the bridge, is immobilized, wherein:
this last element to be immobilized is connected to the shaft of the machine, and
this shaft is connected to a fixed base of the assembly.

4. Method according to claim 1, wherein:
a first element is connected to a second element to eliminate a first degree of freedom, and
this second element is connected to a third element to eliminate a second degree of freedom.

5. Method according to claim 4, wherein:
a transmission device having two electrical machines is implemented, and
the first element is connected to the shaft of one of the machines and the third element is connected to the shaft of the other machine, and
the second element is connected to the shafts of the two machines.

6. Method according to claim 1, wherein:
one of the elements is immobilized to eliminate a first degree of freedom, and
two other elements are connected to one another to eliminate a second degree of freedom.

7. Method according to claim 6, wherein:
one of the elements is connected to a fixed base of the device, and
two other elements are connected to the shaft of the machine.

8. Power transmission device between an outlet of a heat engine and a shaft of wheels, this device comprising:
an inlet shaft connected to the outlet of the heat engine, and an outlet shaft connected to the shaft of wheels,
at least one electrical machine comprising a shaft, and
a mechanical assembly connecting the inlet shaft, the outlet shaft and the shaft of the machine with one another, this mechanical assembly being formed by at least two planetary gear trains, these two planetary gear trains each having several elements that mesh mutually, including a sun gear, planet gears connected to a planet carrier, and a ring gear,
wherein said device includes:
a first dog clutch disposed on the shaft of the electrical machine and capable of connecting the shaft of the electrical machine to a fixed element,
wherein the mechanical assembly is made up of two planetary gear trains, these two planetary gear trains each having several elements that mesh mutually, including a sun gear, planet gears connected to a planet carrier, and a ring gear;
wherein connections between the elements of the mechanical assembly are organized so that this assembly has only two degrees of freedom, one degree of freedom being a capability of the mechanical assembly in which the speeds of the elements of the assembly are not dependent from one another, and these two degrees of freedom are eliminated inside the mechanical assembly.

9. Device according to claim 8, which includes:
a second dog clutch disposed on the inlet shaft and capable of connecting the inlet shaft to the fixed element.

10. Device according to claim 8, wherein:
the bridge forms a permanent gear, and
the mechanical assembly forms an intermittent gear with several gear ratios.

* * * * *